US006425207B1

(12) United States Patent

Davis

(10) Patent No.: US 6,425,207 B1

(45) Date of Patent: Jul. 30, 2002

(54) WINDOW REGULATOR WITH WINDOW PANEL CLAMP UNIT

(75) Inventor: Stephen H. Davis, Wilder, KY (US)

(73) Assignee: Muncy Corporation, Enon, OH (US)

( * ) Notice: Subject to any disclaimer, the term of this patent is extended or adjusted under 35 U.S.C. 154(b) by 0 days.

(21) Appl. No.: 09/742,198

(22) Filed: Dec. 20, 2000

(51) Int. Cl.[7] .................................................. B60J 1/16

(52) U.S. Cl. .............................. 49/375; 49/349; 49/372

(58) Field of Search .......................... 49/348, 349, 375, 49/374, 372

(56) References Cited

U.S. PATENT DOCUMENTS

| | | | | |
|---|---|---|---|---|
| 3,744,186 A | * | 7/1973 | Tantlinger | |
| 3,897,654 A | | 8/1975 | Kouth et al. | |
| 4,762,904 A | * | 8/1988 | Nakama | 428/122 |
| 5,007,201 A | * | 4/1991 | D'Hoore et al. | 49/348 |
| 5,101,596 A | * | 4/1992 | Moore | 49/351 |
| 5,363,595 A | | 11/1994 | Wirsing | |
| 5,729,930 A | * | 3/1998 | Schust et al. | 49/375 |
| 5,809,695 A | | 9/1998 | Strickland | |
| 5,848,496 A | | 12/1998 | Bertolini et al. | |
| 5,960,588 A | | 10/1999 | Wurm et al. | |
| 5,966,872 A | * | 10/1999 | Wasek et al. | 49/375 |
| 6,041,549 A | * | 3/2000 | Schust et al. | 49/375 |
| 6,233,873 B1 | * | 5/2001 | Lawrie et al. | 49/375 |

* cited by examiner

*Primary Examiner*—Gregory J. Strimbu

(74) *Attorney, Agent, or Firm*—Jacox, Meckstroth & Jenkins

(57) ABSTRACT

A motor vehicle window regulator includes a helically wound wire coil on a flexible lubricating core to form a flexible cable, and the cable is confined within an elongated guide tube having a longitudinally extending slot. The coil is moved longitudinally within the tube by a helical drive gear, and a lower end portion of the cable carries a window lifting bracket or T-bracket having laterally projecting wings. A clamp unit is mounted on each wing and includes a U-shaped clamp body defining a recess which receives a pressure block and a U-shaped gasket for receiving an edge portion of a glass window panel. Set screws thread through the clamp bodies and extend through holes in the wings for engaging the pressure blocks to clamp the edge portion of the window panel to the clamp bodies. Each clamp body comprises a short section of an aluminum extrusion and defines slots or grooves receiving edge portions of the gasket and the T-bracket wing.

14 Claims, 2 Drawing Sheets

WINDOW REGULATOR WITH WINDOW PANEL CLAMP UNIT

BACKGROUND OF THE INVENTION

The present invention relates to motor vehicle window regulators of the general type disclosed in U.S. Pat. Nos. 3,897,654, 5,809,695, 5,848,496 and 5,960,588. Such regulators commonly use one or two guide tracks each of which supports a cable operated window panel lifting device. For example, the regulators disclosed in the above '695, and '496 and '588 patents use a pair of guide tracks, and the regulator disclosed in the '654 patent uses a single guide track in the form of a split guide tube enclosing a flexible cable in the form of helically wound wire on a lubricating core material. A formed sheet metal bracket is attached to the lower end portion of the cable and is connected to the lower edge portion of the window panel, for example, by a bonded lifting bar as disclosed in the '654 patent. The cable usually moves longitudinally within the guide tube by a helical pinion or gear which may be connected to a hand crank or a power operated drive motor and gear reducer unit.

The window panel lifting member of the window regulator is connected to the lower edge portion of the window panel by different methods and devices. For example, a U-shaped bar may be bonded or cemented to the lower edge portion of a glass window panel or U-shaped gripping brackets may be clamped to the lower edge portion of the window panel, for example, as shown in the above '695, '496, and the '588 patents. The window panel may also be connected by a U-shaped lifting bracket with a threaded fastener which extends through a hole within the window panel, for example, as disclosed in U.S. Pat. No. 5,363,595.

It is desirable to eliminate the requirement of forming holes in the glass window panel for attaching the lifting member of the regulator and thereby avoid the cost of forming the holes and possible damage to the window panel. It is also desirable for the connection of the regulator lift member to provide for an adjustable and positive grip of the window panel while also being compact and light weight in addition to being economical in construction and providing for gripping glass window panels with variations in thickness. As apparent, none of the above-mentioned patents provide a window panel lift connection which provides all of these desirable features.

SUMMARY OF THE INVENTION

The present invention is directed to a window regulator which incorporates an improved device or unit which connects or clamps the lift member of the window regulator to a window panel and which provides all of the desirable features mentioned above. In accordance with one embodiment of the invention, a clamp unit includes a C-shaped clamp body formed from an aluminum extrusion, and the clamp body defines a recess which receives a U-shaped resilient gasket having upper edge portions confined within corresponding slots within the clamp body. The gasket adjustably receives a lower edge portion of the window panel, and a rigid pressure block is also confined within the clamp body between one leg of the gasket and the inner end of a clamping screw threaded through the clamp body. The clamping screw also extends through a hole within a wing portion of a sheet metal lifting bracket of the regulator so that when the screw is tightened, the window panel is gripped with substantial and uniform pressure and is connected to the regulator bracket.

Other features and advantages of the invention will be apparent from the following description, the accompanying drawings and the appended claims.

DESCRIPTION OF THE PREFERRED EMBODIMENT

Figure 1:
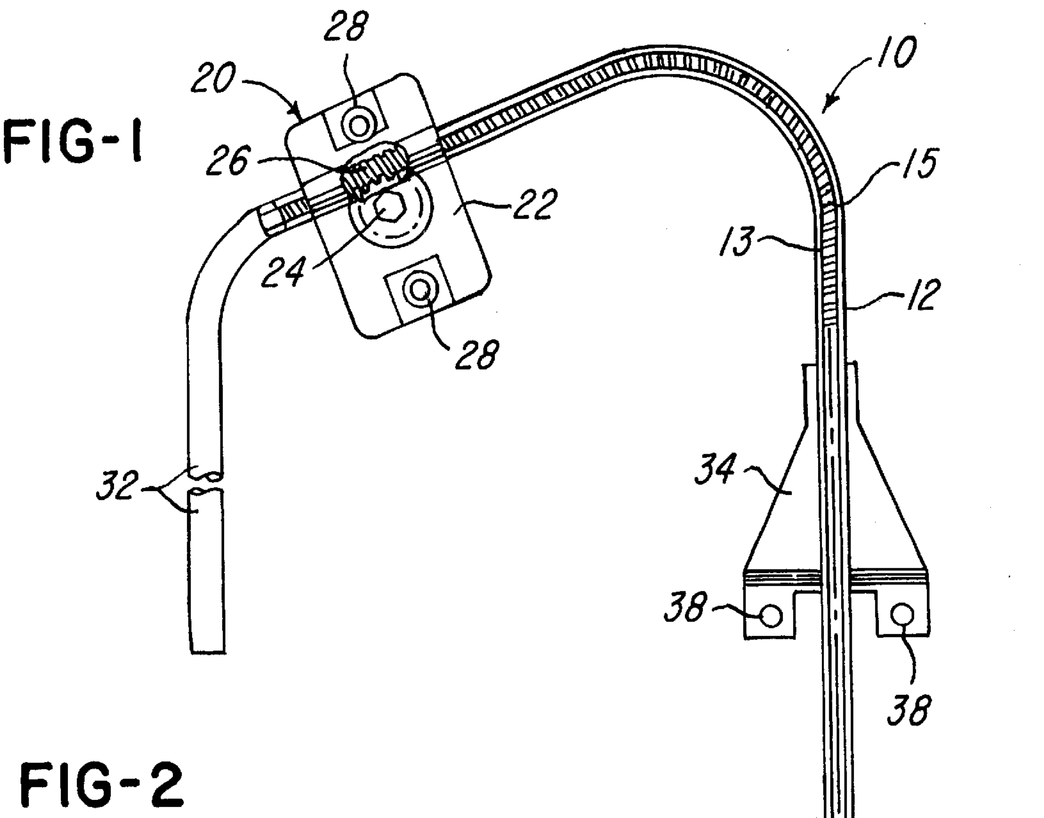
FIG. 1 is an elevational view of a window regulator incorporating a pair of window panel clamping units constructed in accordance with the invention.
Figure 1:
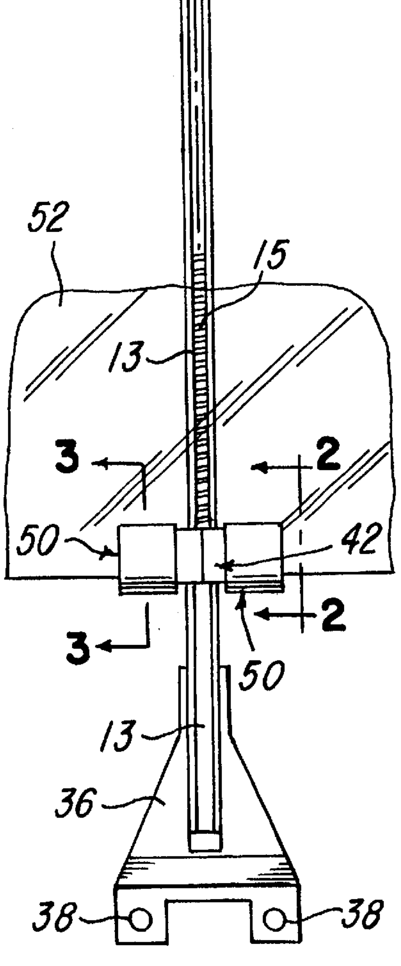

FIG. 1 illustrates a window regulator 10 which includes an elongated roll-formed guide tube 12 having a longitudinally extending slot 13 providing the tube with a C-shaped cross-sectional configuration. The guide tube 12 encloses an elongated flexible cable 15 which slides axially or longitudinally within the guide tube and which is formed by helically winding a wire around a flexible core having fibers projecting outwardly between the helical turns of the coil for wiping the inner surface of the guide tube. The core is provided with a lubricant which is conveyed by the fibers to the inner surface of the guide tube to minimize friction for the sliding movement of the cable within the guide tube, for example, as disclosed in the above-mentioned U.S. Pat. No. 3,897,654.

The regulator 10 also includes an actuator or drive 20 which is illustrated as a manual actuator or drive, but may also be a power operated drive including an electric motor and gear reducer unit. As shown in FIG. 1, the drive 20 includes a mounting bracket 22 which supports a drive shaft 24 to which is secured a pinion or helical gear 26 for engaging the wire turns of the cable 15. The shaft 24 connects with a drive such as a manual window crank or an electric motor and gear reducer drive unit. A pair of nuts 28 are carried by the bracket 22 for attaching the drive 20 to a component of a motor vehicle such as frame members within a door on a vehicle body. A flexible tube 32 connects with the upper end of the guide tube 12 and receives the projecting end portion of the cable 15 when the cable is moved longitudinally within the guide tube 12 by operation of the drive 20.

Figure 4:
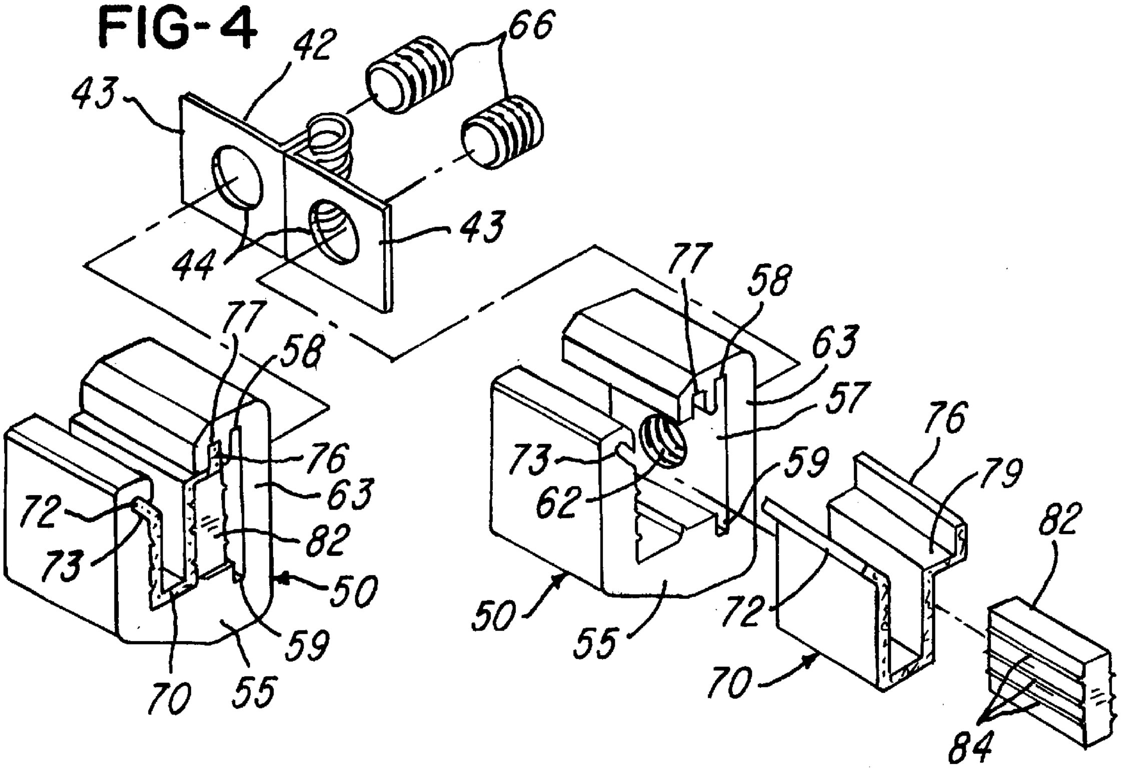
FIG. 4 is an exploded perspective view of the window panel clamping units shown in FIGS. 1–3.

A set of Y-shaped mounting brackets 34 and 36 are also attached to the guide tube 12, and cooperate with the bracket 22 for attaching the window regulator 10 to the motor vehicle door frame members or to other components of the motor vehicle body. Each of the brackets 34 and 36 has a pair of holes 38 for receiving suitable fasteners such as screws or snap plugs. As shown in FIG. 4, a T-shaped sheet metal window lifting or carriage bracket 42 is attached to the lower end portion of the cable 15 by a crimping operation and projects outwardly through the slot 13 within the guide tube 12. The bracket 42 includes laterally projecting and coplanar flanges or wings 43 each of which is provided with a hole 44.

Figure 3:
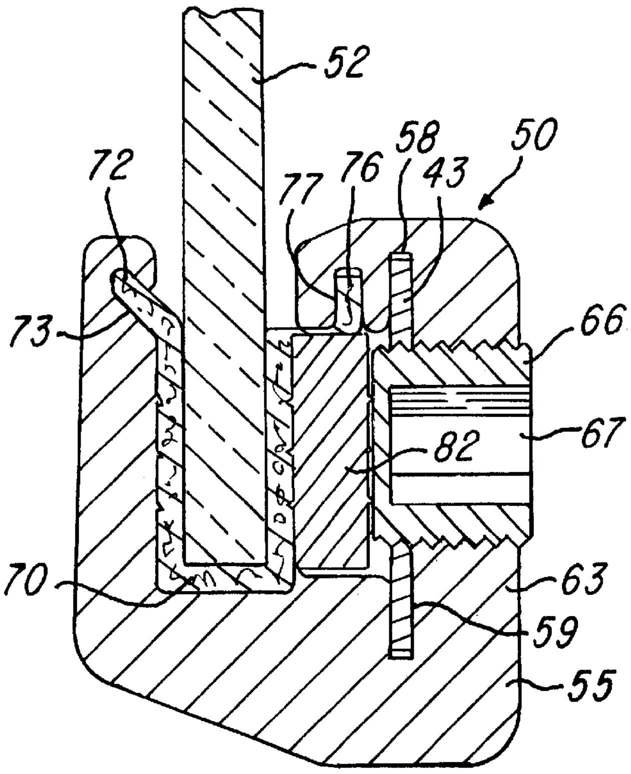
FIG. 3 is an enlarged fragmentary section taken generally on the line 3—3 of FIG. 1.

In accordance with the present invention, a clamp assembly or unit 50 connects each of the flanges or wings 43 of the bracket 42 to the bottom edge portion of a transparent window panel or glass panel 52 for moving the panel generally vertically in response to parallel movement of the slide bracket 42 within the guide tube 12. Since the clamp units 50 are identical, only one will be described in detail. Thus, each clamp units 50 includes a generally U-shaped body 55 which is preferably constructed by cutting a section from an aluminum extrusion. The clamp body 55 defines a recess 57 (FIG. 4) which includes opposing slots 58 and 59 for receiving the corresponding wing 43 of the lifting T-bracket 42. A threaded hole 62 is formed within an inner wall 63 of the clamp body 55 and receives a cup-shaped set screw 66 having a hexagonal recess 67 for receiving an Allen wrench (not shown). As shown in FIG. 3, the screw 66 projects through the hole 44 of the corresponding bracket wing 43 for retaining the clamp body 55 on the T-bracket wing 43.

The recess 57 of each clamp body 55 also receives a U-shaped gasket 70 which defines a slot for receiving the lower edge portion of the window panel 52, and the gasket 70 is formed of a flat strip or piece of resilient but firm rubber cork material. As best shown in FIG. 3, the gasket 70 has an inclined upper edge portion 72 which is received within a mating retaining slot 73 formed or extruded within the body 55. The gasket also has a vertical opposite upper edge portion 76 which is retained within a slot 77 formed or extruded within the clamp body 55, and a thin compressed horizontal wall 79 of the gasket material connects the offset edge portion 76 to the U-shaped portion of the gasket 70, as shown in FIGS. 3 and 4.

A pressure pad or block 82 is also positioned within the recess 57 of the clamp body 55 between the inner end surface of the screw 66 and the inner or adjacent wall of the gasket 70. The pressure pad or block 82 may be formed from an aluminum extrusion or may be molded of a rigid plastics material or other materials, As shown in FIG. 4, the block 82 has a series of parallel spaced V-shaped ribs 84 on opposite side surfaces of the block. On one side, the ribs 84 penetrate the inner wall of the resilient gasket 70, as shown in FIG. 3, and the ribs 84 on the opposite side are engaged by the inner surface of the clamping screw 66.

Figure 2:
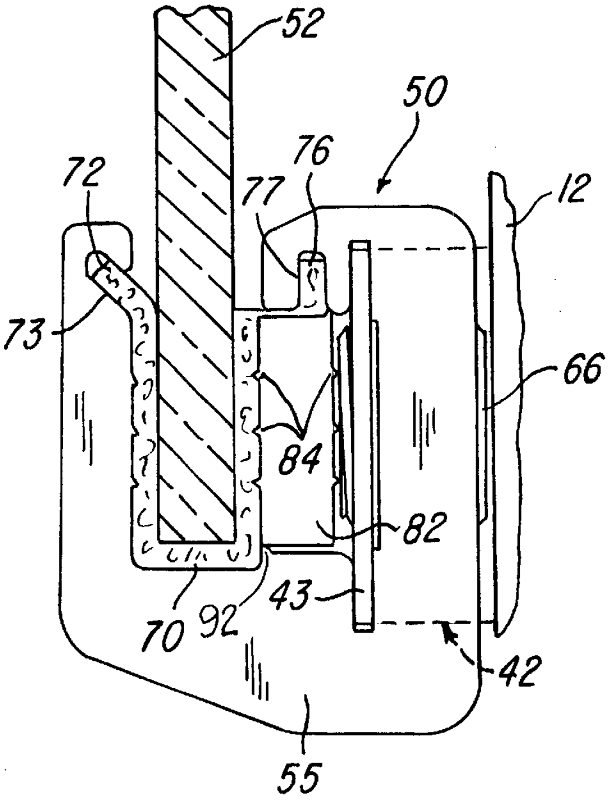
FIG. 2 is an enlarged elevational view of a clamping unit shown in FIG. 1 and taken generally on the line 2—2 of FIG. 1.

While two of the clamping units 50 are illustrated in FIGS. 1 and 4 and are preferred for dual gripping of the window panel and for balancing the lifting forces on the lifting bracket 42, it is possible to use only one of the clamp units. As best shown in FIGS. 2 and 3, after the lower edge portion of a window panel 52 is slid into the U-shaped gasket 70 of a clamp unit 50 and is adjusted to a precise position, the set screw 66 is tightened against the pressure pad or block 82 for positively clamping the window panel 52 within the clamp unit. However, before receiving the window panel 52, the pressure pad or block 82 is retained within each clamp unit 50 by confining or slightly squeezing the pressure block between an upwardly projecting rib 92 (FIG. 2) on the clamp body 55 and the thin connecting wall 79 of the resilient gasket 70. This retention of the pressure pad or block 82 prevents the block from sliding out of the clamp unit 50 during handling, transporting and installing the window regulator 10, but allows the block to move laterally in response to the clamping pressure of the screw 66.

From the drawings and the above description, it is apparent that a window regulator incorporating a window panel clamp unit constructed in accordance with the present invention provides desirable features and advantages. For example, each clamp unit 50 produces a substantial compressive force which positively grips and clamps the lower edge portion of the window panel and also provides for precisely adjusting the window panel relative to the clamp unit before the screw 66 is tightened. The high strength clamp unit 50 is also compact, light weight and simple and economical in construction while also accommodating window panels having considerable variation in thickness. The clamp unit 50 is also reusable if it becomes necessary to replace a broken window panel and requires only an Allen wrench to attach the clamp unit to the window panel or to release the window panel from the clamp unit.

While the form of clamp unit herein described constitutes a preferred embodiment of the invention, it is to be understood that the invention is not limited to this precise form of clamp unit, and that changes may be made therein without departing from the scope and spirit of the invention as defined in the appended claims. The clamp unit of the invention may also be used with various types of window regulators and is not limited to the specific form of regulator disclosed.

What is claimed is:

1. A window regulator adapted for use in a motor vehicle to move a window panel between open and closed positions, said regulator comprising a window panel carrier supported for movement, a drive for moving said carrier, a clamp assembly for connecting said carrier to said window panel and including a rigid U-shaped clamp body defining a recess, a window gripping gasket disposed within said recess and defining a slot for receiving an edge portion of said window panel, a pressure pad disposed within said recess adjacent said gasket, and a screw threadably engaging said body and extending through said body to engage with and apply pressure against said pressure pad for positively clamping said edge portion of said window panel within said slot.

2. A window regulator as defined in claim 1 wherein said carrier comprises a bracket having a generally flat wing, said clamp body defines a groove for receiving said wing, and said wing having a hole receiving said screw to retain said clamp body on said bracket.

3. A window regulator as defined in claim 1 wherein said clamp body comprises a section of a metal extrusion.

4. A window regulator as defined in claim 1 wherein said carrier comprises a sheet metal bracket having coplanar generally flat wing portions, and said clamp assembly comprises two said clamp assemblies each mounted on a respective one of said wing portions of said bracket.

5. A window regulator as defined in claim 1 wherein said gasket comprises a generally U-shaped gasket member having opposing upper edge portions, and said clamp body defines grooves receiving said edge portions of said gasket member for retaining said gasket member therein.

6. A window regulator as defined in claim 1 wherein said pressure pad is generally rectangular and has opposite side surfaces, and at least one of said side surfaces has parallel spaced ribs engaging said gasket.

7. A window regulator as defined in claim 1 wherein said gasket is resilient and includes a portion urging said pressure pad against said clamp body for retaining said pressure pad within said recess.

8. A window regulator adapted for use in a motor vehicle to move a window panel between open and closed positions, said regulator comprising an elongated track, a flexible cable extending adjacent said track for movement with respect thereto, a drive for moving said cable along said track, a lifting bracket secured to said cable, a clamp assembly including a rigid U-shaped clamp body defining a recess receiving said bracket, a window gripping gasket disposed within said recess and defining a slot for receiving a lower edge portion of said window panel, a pressure pad disposed within said recess adjacent said gasket, and a screw threadably engaging said body and extending through said body and said bracket to engage with and apply pressure against said pressure pad for positively clamping said edge portion of said window panel within said slot.

9. A window regulator as defined in claim 8 wherein said bracket has a generally flat wing, said clamp body defines a groove for receiving said wing, and said wing having a hole receiving said screw to retain said clamp body on said bracket.

10. A window regulator as defined in claim 8 wherein said clamp body comprises a section of an aluminum extrusion.

11. A window regulator as defined in claim 8 wherein said bracket has coplanar generally flat wing portions, and said clamp assembly comprises two said clamp assemblies each mounted on a respective one of said wing portions of said bracket.

12. A window regulator as defined in claim 8 wherein said gasket comprises a generally U-shaped gasket member having opposing upper edge portions, and said clamp body defines grooves receiving said edge portions of said gasket member for retaining said gasket member therein.

13. A window regulator as defined in claim 8 wherein said pressure pad is generally rectangular and has opposite side surfaces, and at least one of said side surfaces has parallel spaced ribs engaging said gasket.

14. A window regulator as defined in claim 8 wherein said gasket is resilient and includes a portion urging said pressure pad against said clamp body for retaining said pressure pad within said recess.

* * * * *